(12) United States Patent
Verser et al.

(10) Patent No.: US 7,524,904 B2
(45) Date of Patent: Apr. 28, 2009

(54) PROCESS AND APPARATUS FOR SEPARATING POLYMER SOLIDS, HYDROCARBON FLUIDS, AND PURGE GAS

(75) Inventors: Donald W. Verser, Houston, TX (US);
David H. Burns, Houston, TX (US);
John D. Hottovy, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 819 days.

(21) Appl. No.: 10/700,006

(22) Filed: Nov. 3, 2003

(65) Prior Publication Data

US 2004/0136882 A1 Jul. 15, 2004

Related U.S. Application Data

(63) Continuation-in-part of application No. 10/662,249, filed on Sep. 15, 2003, now Pat. No. 6,818,186, and a continuation-in-part of application No. 10/662,260, filed on Sep. 15, 2003, now Pat. No. 6,838,531.

(60) Provisional application No. 60/411,254, filed on Sep. 16, 2002, provisional application No. 60/411,255, filed on Sep. 16, 2002.

(51) Int. Cl.
*C08F 2/00* (2006.01)
*C08F 6/00* (2006.01)
*B01J 8/00* (2006.01)

(52) U.S. Cl. .............................. 526/67; 526/64; 526/68; 526/70; 526/72; 526/918; 526/920; 422/131; 422/132

(58) Field of Classification Search ................. 422/131, 422/132, 134, 138; 526/62, 64, 67, 68, 69, 526/70
See application file for complete search history.

(56) References Cited

U.S. PATENT DOCUMENTS

| | | | | |
|---|---|---|---|---|
| 3,035,040 A | * | 5/1962 | Findlay | 526/64 |
| 3,594,356 A | * | 7/1971 | Hinton | 528/483 |
| 3,696,162 A | * | 10/1972 | Kniel | 95/174 |
| 3,816,379 A | * | 6/1974 | Rosenbaum et al. | 528/501 |
| 3,869,807 A | * | 3/1975 | Perry | 34/500 |
| 4,284,837 A | * | 8/1981 | Lutz | 585/523 |
| 4,365,057 A | * | 12/1982 | Saito et al. | 528/503 |
| 4,501,885 A | * | 2/1985 | Sherk et al. | 528/501 |
| 5,314,579 A | * | 5/1994 | Sung | 159/47.1 |
| 5,455,314 A | | 10/1995 | Burns | 526/61 |

(Continued)

FOREIGN PATENT DOCUMENTS

WO WO 00/53306 A1 * 9/2000

*Primary Examiner*—Jennifer A Leung
(74) *Attorney, Agent, or Firm*—Fletcher Yoder

(57) ABSTRACT

A process and apparatus for separating polymer solids, hydrocarbon fluids, and purge gas in an intermediate pressure zone and a purge zone. The purge gas in the purge zone is used to remove hydrocarbon fluids from the polymer solids, and a stream containing the purge gas and hydrocarbons is passed to a hydrocarbon/purge gas recovery zone. High-purity purge gas from the recovery zone is efficiently used by passing a portion back to the purge zone and another portion to an extruder feed zone. Hydrocarbon fluids separated from polymer solids in the intermediate pressure zone and in the hydrocarbon/purge gas recovery zone are liquefied and passed to a recycle zone, and the hydrocarbons (typically liquid diluent and/or unreacted monomer) are recycled to the reactor without fractionation.

36 Claims, 3 Drawing Sheets

U.S. PATENT DOCUMENTS

| | | | |
|---|---|---|---|
| 5,533,437 A * | 7/1996 | Howard et al. | 95/42 |
| 5,565,174 A | 10/1996 | Burns | 422/131 |
| 5,597,892 A * | 1/1997 | Hanson | 528/501 |
| 5,624,877 A | 4/1997 | Kufeld | 502/120 |
| 5,648,439 A | 7/1997 | Kufeld | 526/96 |
| 6,045,661 A * | 4/2000 | Kreischer et al. | 203/73 |
| 6,262,191 B1 | 7/2001 | Hottovy et al. | 526/64 |
| 6,420,497 B1 | 7/2002 | Tait | 526/64 |
| 6,559,247 B2 * | 5/2003 | Kufeld et al. | 526/64 |
| 6,566,460 B1 * | 5/2003 | Salmon | 526/64 |

\* cited by examiner

PROCESS AND APPARATUS FOR SEPARATING POLYMER SOLIDS, HYDROCARBON FLUIDS, AND PURGE GAS

RELATED APPLICATIONS

This application is a continuation-in-part of U.S. application Ser. No. 10/662,249, now issued as U.S. Pat. No. 6,818,186, entitled "Process And System For Removing Heavies From Diluent Recycled To A Slurry Polymerization Reactor," filed Sep. 15, 2003, which claims the benefit under 35 U.S.C. § 119(e) of U.S. Provisional Application No. 60/411,254, entitled "Process And System For Removing Heavies From Diluent Recycled To A Slurry Polymerization Reactor," filed Sep. 16, 2002. This application is also a continuation-in-part of U.S. application Ser. No. 10/662,260, now issued as U.S. Pat. No. 6,838,531, entitled "Process And Apparatus For Separating Diluent From Polymer Solids", filed Sep. 15, 2003, which claims the benefit under 35 U.S.C. § 119(e) of U.S. Provisional Application No. 60/411,255 entitled "Process And Apparatus For Separating Diluent From Polymer Solids" filed on Sep. 16, 2002. The specification and claims of each patent and patent application identified in this paragraph are hereby incorporated herein by reference to provide continuity of disclosure.

FIELD OF INVENTION

The present process and apparatus relate to slurry polymerization, particularly to the separation of polymer solids, hydrocarbon fluids, and purge gas produced in or used for slurry polymerization and polymer recovery.

BACKGROUND OF THE INVENTION

Polyolefins such as polyethylene and polypropylene and other polymers may be prepared by particle form polymerization, also referred to as slurry polymerization. In this technique, feed materials such as olefin, monomer and catalyst are introduced to a reaction zone, and a slurry comprising solid polyolefin particles in a liquid medium is formed in the reaction zone.

In commercial loop reactors, the various feed materials may be introduced to the loop reaction zone in various ways. For example, the monomer and catalyst may be mixed with varying amounts of a diluent prior to introduction to the loop reaction zone. In the loop reaction zone, the monomer and catalyst become dispersed in the slurry. The slurry circulates through the loop reaction zone, and the monomer reacts at the catalyst in a polymerization reaction. The polymerization reaction yields solid polymer particles in the slurry.

In order to recover the polymer solids from a particle form polymerization process, it is necessary to separate the polymer solids and hydrocarbon fluids that make up the effluent slurry withdrawn from the reactor. Typical separation systems include a reduction in pressure so that the hydrocarbon liquids vaporize. The vaporized hydrocarbons exit at a top portion of a flash gas separator. The polymer remains solid, and is recovered through a bottom portion of the flash zone. Other polymer recovery processes utilize multiple stage flash systems. For example, a first intermediate pressure flash zone and a second lower pressure flash zone may be employed. The temperature and the pressure in the first flash zone are such that a major amount of the diluent will be vaporized and that vapor can be condensed without compression by heat exchange with a fluid having a temperature, for example, in the range of from about 120° F. to about 200° F. The polymer particles from the first flash step may then be subjected to a lower pressure flash step to vaporize additional remaining diluent.

In a polymer recovery system utilizing one or more flash chambers, it has been common to have some diluent entrained in the polymer leaving the flash chamber(s). It is desirable, however, to obtain polymer product substantially free of diluent. If the polymer leaving the flash chamber contains an excessive amount of diluent, the polymer product can become tacky, and then may plug up lines and cause restrictions. In many polymer production processes, polymer solids after the flash chamber are subjected to further processing to remove residual and entrained diluent. Examples of such processing include purge zones, conveyer dryers, and other drying systems known in the art.

One method for removing additional amounts of diluent after the flash chamber involves passing the polymer solids through a purge column, wherein a non-combustible gas is used to remove the diluent. In the purge column, the non-combustible gas (nitrogen is often used) typically flows upward through downward-flowing polymer solids in the column. The purge gas is used to remove and carry away hydrocarbon fluids that remain with the polymer solids after the flash separating steps. The purge gas is especially suited to remove hydrocarbon fluids that are entrained in the pores and interstices of the solid polyolefin particles. At the top (or gas outlet) of the purge column, a fluid stream comprising the purge gas and removed hydrocarbon fluid (typically and preferably gas) exits.

At the bottom (or solids outlet) of the purge zone, polymer solids exit and are passed along for finishing operations, such as extrusion. Typically polymer solids are passed to an extruder feed tank which holds the polymer solids and feeds the polymer solids to the extruder. The extruder feed tank is at very low pressure (for example, 0 to 5 psig) and the polymer solids are fed by force of gravity to the extruder. Typically, the polymer solids have been passed from the purge zone to the extrusion feed zone via pneumatic transfer. Generally, the inert gas systems for the purge column and the extruder feed tank have been separate, since inert gas exiting from the purge column contained hydrocarbon impurities even after passing through a recovery unit to remove hydrocarbons.

BRIEF SUMMARY OF THE INVENTION

As one aspect of the present invention, a process is provided for slurry polymerization and for separating hydrocarbon fluid from solid polymer particles and purge gas. At least one olefin monomer is polymerized in a reaction zone to produce a slurry comprising solid polymer particles and hydrocarbon fluid. A portion of the slurry is withdrawn from the reaction zone, and at least a majority of the hydrocarbon fluid is separated from the solid polymer particles in an intermediate pressure zone as a vaporized hydrocarbon fluid stream. The vaporized hydrocarbon fluid stream is condensed in a condensing zone, whereby a condensed hydrocarbon fluid stream is formed. The solid polymer particles are transferred from the intermediate pressure zone to a purge zone in which a purge gas is passed through the solid polymer particles to remove entrained hydrocarbon fluid, thereby forming a mixed stream containing hydrocarbon vapor and purge gas. The mixed stream is transferred to a recovery zone where the purge gas and hydrocarbon fluid are separated to form a recovered purge gas stream and a recovered hydrocarbon fluid stream. At least a portion of the recovered purge gas stream is passed from the recovery zone to the purge zone. Another portion of the recovered purge gas stream is passed from the recovery zone to an extrusion feed zone. Fresh purge gas can be fed to the extrusion feed zone; when this is done, one may refrain from feeding fresh purge gas to the purge zone.

As another aspect, a process for slurry polymerization and for separating hydrocarbon fluid from solid polymer particles and purge gas is provided. At least one olefin monomer is polymerized in a reaction zone to produce a slurry comprising solid polymer particles and hydrocarbon fluid. A portion of the slurry is withdrawn from the reaction zone, and at least a majority of the hydrocarbon fluid is separated from the solid polymer particles in an intermediate pressure zone as a vaporized hydrocarbon fluid stream. The vaporized hydrocarbon fluid stream is condensed in a condensing zone, whereby a condensed hydrocarbon fluid stream is formed, which is passed to a recycle zone. The solid polymer particles are transferred from the intermediate pressure zone to a purge zone in which a purge gas is passed through the solid polymer particles to remove entrained hydrocarbon fluid, thereby forming a mixed stream containing hydrocarbon vapor and purge gas. The mixed stream is transferred to a recovery zone where the purge gas and hydrocarbon fluid are separated to form a recovered purge gas stream and a recovered hydrocarbon fluid stream. At least a portion of the recovered purge gas stream is passed from the recovery zone to the purge zone, and at least a portion of the recovered hydrocarbon fluid stream is passed from the recovery zone to the recycle zone. At least a majority of the hydrocarbon liquid in the recycle zone is transferred to the reaction zone without fractionating the hydrocarbon liquid. A portion of the recovered purge gas stream may be used to provide motive force for movement of solid polymer particles which have already passed through the purge zone.

In the foregoing processes, the recovery zone may use pressure swing adsorption to recover the purge gas and the hydrocarbon fluid from the mixed stream. The recovery zone process may utilize compression and condensation to recover the hydrocarbons and pressure swing adsorption (or membranes) to purify the purge gas with a portion recycled back to compression. The recovered purge gas stream exiting the recovery zone contains less than 5000 ppm of hydrocarbon, alternatively less than 1000 ppm of hydrocarbon, alternatively less than 500 ppm of hydrocarbon. Alternatively, the recovered purge gas stream exiting the recovery zone can be essentially free of hydrocarbon.

The processes may also comprise transferring vapor from the recycle zone to a fractionation zone and/or transferring substantially no liquid from the recycle zone to the fractionation zone. The processes may further comprise transferring a minor portion of liquid hydrocarbon from the fractionation zone to a catalyst mud preparation zone, and/or transferring a major potion of the liquid hydrocarbon from the fractionation zone to the recycle zone. In the foregoing processes, flaring the recovered purge gas stream from the recovery zone can be avoided. Preferably, the recovered purge gas stream from the recovery zone is not flared.

In the foregoing processes, the recovered purge gas stream may be at least partially used for transporting solid polymer particles which have exited the purge zone. The condensed hydrocarbon fluid stream may be transferred from the condensing zone to a recycle zone, and at least a majority of the hydrocarbon liquid in the recycle zone may be transferred to the reaction zone without fractionating the hydrocarbon liquid. At least a portion of the recovered hydrocarbon fluid stream from the recovery zone may be passed to the recycle zone.

As yet another aspect, an apparatus is provided for slurry polymerization in a hydrocarbon fluid and for separating hydrocarbon fluid from solid polymer particles and purge gas. The apparatus comprises a polymerization reactor in which one or more olefins are polymerized to form solid polymer particles in a hydrocarbon fluid. The apparatus also comprises an intermediate pressure chamber adapted for the separation of hydrocarbon fluid from the solid polymer particles. The chamber has an inlet for receiving hydrocarbon fluid and solid polymer particles from the polymerization reactor, a polymer outlet for discharging solid polymer particles, and a gas outlet for discharging vaporized hydrocarbon fluid. The apparatus also comprises a condenser fluidly connected to the gas outlet of the intermediate pressure chamber. The condenser is adapted for condensing the vaporized hydrocarbon fluid by heat exchange and without compression. The apparatus comprises a purge column fluidly connected to the polymer outlet of the intermediate pressure chamber. The purge column is adapted for receiving the solid polymer particles from the intermediate pressure chamber. The apparatus also comprises a hydrocarbon/purge gas recovery unit adapted for the separation of hydrocarbon fluid from purge gas, and the recovery unit is fluidly connected to a top portion of the purge column and receives a fluid stream comprising purge gas and hydrocarbon fluid from the purge column. The apparatus also comprises a recycle tank adapted to receive hydrocarbon liquid from the condenser, and the recycle tank is fluidly connected to the reactor. The apparatus also comprises an extruder feed tank connected to the purge column. The extruder feed tank receiving solid polymer from the purge column and receiving a portion of the purge gas stream exiting the recovery unit.

As yet another aspect, an apparatus is provided for slurry polymerization in a hydrocarbon fluid and for separating hydrocarbon fluid from solid polymer particles and purge gas. The apparatus comprises a polymerization reactor in which one or more olefins are polymerized to form solid polymer particles in a hydrocarbon fluid. The apparatus also comprises an intermediate pressure chamber adapted for the separation of hydrocarbon fluid from the solid polymer particles. The chamber has an inlet for receiving hydrocarbon fluid and solid polymer particles from the polymerization reactor, a polymer outlet for discharging solid polymer particles, and a gas outlet for discharging vaporized hydrocarbon fluid. The apparatus comprises a condenser fluidly connected to the gas outlet of the intermediate pressure chamber. The condenser is adapted for condensing the vaporized hydrocarbon fluid by heat exchange and without compression. The apparatus also comprises a purge column fluidly connected to the polymer outlet of the intermediate pressure chamber. The purge column is adapted for receiving the solid polymer particles from the intermediate pressure chamber. The apparatus also comprises a hydrocarbon/purge gas recovery unit adapted for the separation of hydrocarbon fluid from purge gas. The recovery unit is fluidly connected to a top portion of the purge column and receives a fluid stream comprising purge gas and hydrocarbon fluid from the purge column. The apparatus also comprises a recycle tank adapted to receive hydrocarbon liquid from the condenser, and the recycle tank is fluidly connected to the reactor. The recycle tank is also fluidly connected to receive a second hydrocarbon fluid stream from the hydrocarbon/purge gas recovery unit.

In the foregoing apparatus, the hydrocarbon/purge gas recovery unit may include a pressure swing adsorption unit. High efficiency hydrocarbon/purge gas recovery units are available from commercial vendors such as Air Products and Chemicals, Inc., Allentown, Pa. They include several unit operations, typically compression, condensing, liquid separation, and purge gas purification in the form of PSA or membrane units. The apparatus may also include a fresh purge gas feed connected to the extruder feed tank. The recycle tank may be fluidly connected to receive a second hydrocarbon fluid stream from the hydrocarbon/purge gas recovery unit. The apparatus may also include a vapor delivery conduit attached to a top portion of the recycle tank, and fluidly connected to a first fractionation column. The apparatus may also include a liquid delivery conduit attached to a bottom portion of the recycle tank, and fluidly connected to the polymerization reactor. The apparatus may also include a second fractionation column adapted to receive a top product from the first fractionation column. Preferably, the first and second fractionation columns do not have sidedraws. A sidedraw may be appropriate in the first (heavies) fractionator as a means to recover and recycle 1-hexene comonomer. The apparatus can also have a liquid delivery conduit from the second fractionation column to a catalyst preparation tank. Preferably, the fluid connection between the recycle tank and the reactor does not include a fractionation column, and the recovery unit is not connected to a purge gas flare.

DETAILED DESCRIPTION OF THE INVENTION

Figure 1:
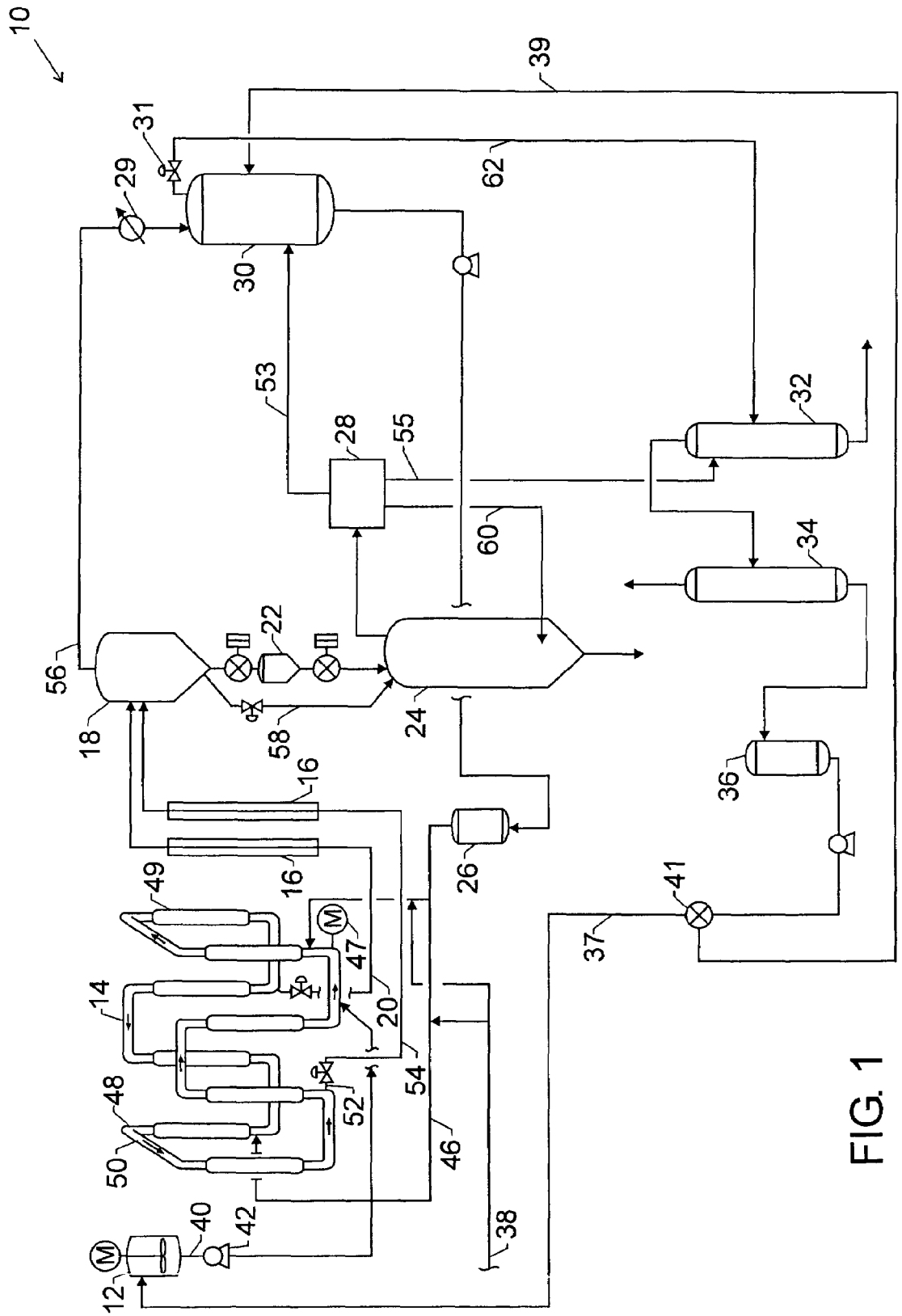
FIG. 1 illustrates a slurry polymerization system comprising a loop polymerization reactor, an intermediate pressure chamber for flash separation, a purge column, a purge gas recovery unit, a recycle tank, and fractionation columns.

The present invention separates hydrocarbon fluids (such as diluent and/or unreacted monomer) from polymer solids in an intermediate pressure zone and transfers the polymer solids from the intermediate pressure zone to a downstream processing zone, such as a purge zone. In the purge zone, additional hydrocarbon fluids are separated from polymer solids and passed to a hydrocarbon/purge gas recovery zone. In the hydrocarbon/purge gas recovery zone, the purge gas is recovered from the hydrocarbon fluids which are converted to liquids.

The present invention is applicable to any slurry polymerization of monomer in a hydrocarbon liquid. The invention is particularly applicable to olefin polymerizations in a diluent in which the resulting polymer is mostly insoluble under polymerization conditions. Most particularly the invention is applicable to any olefin polymerization in a loop reactor utilizing a diluent so as to produce a slurry of polymer solids and liquid diluent. Suitable olefin monomers are 1-olefins having up to 8 carbon atoms per molecule and no branching nearer the double bond than the 4-position. The invention is particularly suitable for the copolymerization of ethylene and a higher 1-olefin such as 1-butene, 1-pentene, 1-hexene, 1-octene and 1-decene. For example, copolymers can be made from ethylene and 0.01 to 10 weight percent, alternatively 0.01 to 5 weight percent, alternatively 0.1 to 4 weight percent higher olefin based on the total weight of ethylene and comonomer. Alternatively sufficient comonomer can be used to give the above-described amounts of comonomer incorporation in the polymer.

Suitable diluents are well known in the art and include hydrocarbons that are inert and liquid under reaction conditions. Suitable hydrocarbons include isobutane, n-butane, propane, n-pentane, i-pentane, neopentane, and n-hexane, with isobutane being especially preferred.

Additionally, the present invention is applicable where the monomer is the hydrocarbon liquid for the olefin polymerization. For example, the present invention may be used for the polymerization of propylene where propylene is the hydrocarbon liquid and an inert diluent is not present in any substantial amount. A diluent may still be used for the catalyst. For illustration, but not as a limitation, the present invention will be described in connection with a polyethylene process using an inert diluent as the hydrocarbon liquid, but it is to be understood that the present invention may also be employed where the monomer is used as the hydrocarbon liquid and would take the place of the diluent in the following descriptions.

Suitable catalysts for slurry olefin polymerizations are well known in the art. Particularly suitable is chromium oxide on a support such as silica as broadly disclosed, for instance, in U.S. Pat. No. 2,825,721 (March 1958), which is incorporated by reference herein. Reference herein to silica supports is meant to also encompass any known silica containing support such as, for instance, silica-alumina, silica-titania and silica-alumina-titania. Any other known support such as aluminum phosphate can also be used. The invention is also applicable to polymerizations using organometal catalysts including those frequently referred to in the art as Ziegler catalysts (or Ziegler-Natta catalysts) and metallocene catalysts.

Additional details regarding loop reactor apparatus and polymerization processes may be found, for example, in U.S. Pat. Nos. 4,424,341; 4,674,290; 5,183,866; 5,455,314; 5,565,174; 5,624,877; 6,005,061; 6,045,661; 6,051,631; 6,114,501; 6,420,497; and 6,559,247, which are also incorporated by reference herein. In slurry polymerizations in a loop reaction zone, it is generally desirable to have a relatively high concentration of polymer solids in the reaction zone. This means that there will be a relatively low concentration or amount of hydrocarbon fluids in the reaction zone (for example, a concentration of 60% by weight or less). It is also desirable to have high-capacity flashlines which provide sufficient heat and/or pressure drop to maximize heat input and vaporization of hydrocarbon fluids.

In slurry polymerizations in a loop reaction zone, the takeoff or withdrawal of slurry can be done on an intermittent basis using settling legs as is well known in the art. The slurry may also be taken off continuously, which can be made even more desirable, for instance, by operating the reactor at a high solids concentration. Further, when the withdrawn portion of the slurry has a high solids concentration, this benefits the separation procedure since less diluent needs to be separated from the polymer. The solids concentration of the withdrawn portion generally will be at least about 35 weight percent, alternatively at least about 50 weight percent, alternatively from about 50 weight percent to about 70 weight percent. Further details regarding continuous take-off of a slurry having a high solids concentration from a loop reaction zone are available in U.S. Pat. No. 6,239,235 and U.S. Patent Application Publication No. 2003/0083444 A1, which are incorporated by reference herein.

During the recovery of polymer from a slurry loop process, it is advantageous to recover the diluent at a sufficiently high pressure (in other words, an intermediate pressure) so that it can be condensed without compression in a heat exchanger at temperature typically available with cooling tower water. Compression requires energy and investment capital. An intermediate pressure is typically lower than then the pressure within the loop reactor but higher than atmospheric pressure. Additional details regarding the use of an intermediate pressure flash tank are available in U.S. Pat. No. 4,424,341, already incorporated by reference. However, polymer has typically been subjected to a low pressure at some point during the recovery process in order to minimize the amount of residual diluent and other reaction components left on the polymer before extrusion or other processing.

One technique for transferring polymer solids from a higher pressure zone to a lower pressure zone is to use two valves with a chamber between the valves (a lockhopper arrangement). Such a system operates by alternating the opening of the top valve and the bottom valve, so that they are not open at the same time, and a pressure differential is maintained between the zone above the top valve and the zone below the bottom valve. A surge (lockhopper) tank (also called a fluff chamber when fluff is being transferred) may be disposed between the two valves. Another technique for transferring polymer solids from high to low pressure is with a restricted pipe discharge system (RPDS). In an RPDS, solids flow continuously in packed-bed flow through a restriction at the outlet.

FIG. 1 is a schematic representation of a slurry polymerization system according to the present invention. The slurry polymerization system includes a catalyst feed tank 12 (such as a catalyst mudpot or an agitated tank) containing a mixture of catalyst and diluent. Catalyst and diluent from the catalyst tank 12 are pumped into a loop reactor 14. FIG. 1 also shows flashline heaters 16, a flash gas separator (also described herein as an intermediate pressure flash chamber) 18, a flash gas line 20, a fluff chamber 22, a purge column 24, a recycle treater 26, an isobutane/nitrogen recovery unit (INRU) 28, a flash gas condenser 29, a recycle tank 30, a heavies fractionation column 32, a lights fractionation column 34, an olefin free surge tank 36, and a series of conduits, pumps and condensers. For the sake of simplicity, components unrelated to the claimed systems and processes and/or that are related to production or routine details, such as intervening valves and connecting lines/conduits of the slurry polymerization system, are not shown.

Catalyst or catalyst and diluent from the catalyst feed tank 12 passes through conduit 40 and is pumped into the loop reactor 14 by pump 42. Suitable catalysts are well known in the art. For example, chromium oxide on a support such as silica may be used, as disclosed in U.S. Pat. No. 2,825,721 already incorporated by reference. Additionally, other catalysts well known in the art (e.g., Ziegler catalysts, metallocene catalysts) may also be used for olefin polymerization.

The slurry polymerization system also includes a monomer feed 38. A monomer such as ethylene, for example, is introduced into the loop reactor 14. Additional conduits and lines may supply monomer and/or diluent into the loop reactor 14 or join in a line 46 for introducing a combined stream of fresh ethylene and diluent recycle as shown. Monomer, diluent, catalyst and any other feed materials may be introduced into the loop reactor 14 at one or several points.

As shown in FIG. 1, the loop reactor 14 may comprise a plurality of vertical members 48 formed integrally with horizontal members 50 (or curved connecting members. In order to maximize heat transfer within the reactor 14, the distance between vertical members 48 is preferably minimized. Thus, the horizontal members 50 may be of minimal length. Alternatively, the horizontal members 50 may be eliminated such that the vertical members 48 are connected through curved connecting members. Alternatively, the loop reactor may be substantially horizontal and not have any vertical members. The longer members 48 may have heat exchange jackets 49. The vertical members 48 and horizontal members 50 (or curved connecting members) define a loop reaction zone. The loop reaction zone may include more or fewer vertical members 48 and corresponding horizontal members 50 as that shown in FIG. 1. Further, the loop reactor may be oriented vertically or horizontally (e.g., by rotating reactor 14 in FIG. 1 by 90 degrees). The connecting members 50 may be any shape or form that connects the vertical segments 48 and allows fluid to flow therebetween.

An impeller is located in the loop reactor 14 to circulate the slurry. The impeller is driven by a motor 47. The impeller is located in the interior of the loop reaction zone defined by the vertical members 48 and the horizontal members 50. The impeller is operable to circulate slurry, comprising liquid diluent and solid olefin polymer particles, through the loop reactor 14.

An intermediate product slurry, comprising the liquid medium and solid polymer particles, is withdrawn, or taken off, from the loop reactor 14 by way of the continuous take-offs 52. Continuous take-offs 52 are shown in U.S. Pat. No. 6,239,235, which has been incorporated by reference herein. The slurry polymerization system 10 may include more or fewer than the continuous take-offs 52 (and corresponding conduits and flashline heaters 16) show in FIG. 1. For example, one, two, three or more continuous take-offs 52 may be used. Further, the continuous take-offs 52 may be tangentially positioned on curved members. It is preferable to position take-offs 52 on a curved members to take advantage of centrifugal force and produce a product with a higher percent solids than is the average in the reactor. Take-offs from the upward flowing elbows are preferred over downward flowing elbows. Take-offs are generally positioned perpendicular to flow. The continuous take-offs 52 may be positioned anywhere on the loop reactor 14. Alternatively, settling legs may be used in conjunction with, or instead of, the continuous take-offs 52.

As slurry is withdrawn from the loop reactor 14 as intermediate product slurry, the intermediate product slurry is passed from the continuous take-off 52 to a flashline 54, which forms a first fluid passage for the withdrawn portion of the slurry to downstream processing apparatus. The flashline 54 may be provided with a flashline heater 16 surrounding at least a portion of the flashline 54. The flashline heater 16 contains a heated fluid (e.g., steam) that provides indirect heating to the contents of the flashline 54, such that intermediate product slurry that passes through the flashline 54 is heated. Preferably, the intermediate product slurry is heated such that at least a majority of the liquid medium is vaporized, thereby yielding hydrocarbon vapor and a post-flashline slurry. The post-flashline slurry comprises the solid polymer particles and a reduced amount of liquid medium (as compared to the intermediate product slurry). Alternatively, the post-flashline slurry may be heated such that less than a majority of the liquid medium is vaporized. Preferably, the intermediate product slurry is heated in the flashline 54 such that, as it enters the flash gas separator 18, essentially all of the liquid medium has been vaporized ("flashed") within the flashline 54. The "flashing" tends to occur as the intermediate product slurry passes across the continuous take-off 52 and the flashline 54. Preferably, the intermediate product slurry is heated in the flashline 54 to fully vaporize the hydrocarbon liquids so that the solids and vapors that discharge into the flash gas separator 18 are free of liquids.

In some systems utilizing a flashline heater 16, some or all of the diluent (or other liquid medium) will flash in flashline 54 prior to introduction to the flash gas separator 18, which may be termed a "flash chamber" or an "intermediate pressure flash chamber." These terms still are frequently used for the tank that follows the flashline, where vaporized diluent separates from polymer solids. "Flash tank" or "flash chamber" are still used even though there may be little or no flashing in the flash tank if all or substantially all of the diluent is vaporized in the flashline. In current designs that have the flashlines discharging at higher pressures and without downstream drying devices, it is intended to design the flashlines so there is little or no pressure drop on entering the flash tank, with essentially all of the liquids vaporized prior to entering the vessel.

After the intermediate product slurry passes through the flashline 54, the resulting post-flashline fluff and vaporized diluent is passed into the flash gas separator 18. The flash gas separator 18 preferably is at an intermediate pressure, lower than the pressure in the reactor but higher than the pressure of downstream apparatus. Preferably the flash gas separator 18 is at a pressure whereby the flashed vapor (or a majority or other large portion) may be condensed by heat exchange without compression. In the flash gas separator 18, most of the diluent, unreacted monomer, and other hydrocarbon fluids form a vapor stream that rises toward a top portion of the flash gas separator 18, while "fluff" falls to a bottom portion of the flash gas separator 18. The fluff comprises solid polymer, which may have trace or other small amounts of diluent entrained therein. In the process and apparatus depicted in FIG. 1, flash chamber 18 is an intermediate pressure chamber, for example, the intermediate pressure chamber of a two-stage flash system as set forth in Hanson et al. U.S. Pat. No. 4,424,341, which has been incorporated by reference herein. Preferably, the intermediate pressure chamber or zone can be operated at a pressure within the range of 100-1500 psia (7-105 kg/cm$^2$), preferably 125-275 psia (8.8-19 kg/cm$^2$), more preferably 150-250 psia (10.5-17.6 kg/cm$^2$) or 130-190 psia (9.1-13.4 kg/cm$^2$). Other desirable ranges are from about 100 to about 190 psia, and from about 120 to about 170 psig. The intermediate pressure chamber or zone can be operated at a temperature within the range of 100-250° F. (37.8-121° C.), preferably 130-230° F. (54.4-110° C.), more preferably 150-210° F. (65.6-98.9° C.) or 170-200° F. (76.6-93.3° C.). The foregoing values may be approximate. The narrower ranges are particularly suitable for polymerizations using 1-hexene comonomer and isobutane diluent, and the broader ranges are particularly suitable for higher 1-olefin comonomers and hydrocarbon diluents in general. In the intermediate pressure chamber, hydrocarbon vapors are separated from polymer solids. Generally, the hydrocarbon vapor rise to the top of the intermediate pressure chamber and exit through a flash gas outlet at a top portion of the chamber. The polymer solids pass to the bottom and exit through a solids outlet at a bottom portion of the intermediate pressure chamber. It is desirable to hold the polymer solids in the intermediate pressure chamber for a time sufficient to obtain the desired level of devolatilization, preferably to separate substantially all the unentrained hydrocarbon fluid from the polymer solids. One may choose to hold the polymer solids in the chamber until all or almost all of the hydrocarbon fluid has been separated (not although some entrained hydrocarbon fluid may remain).

The fluff may pass to a second flash gas separator (for example, a low pressure flash chamber). A two-stage flash system is also disclosed in U.S. Pat. No. 4,424,341. Alternatively, the fluff may pass from a bottom portion of the first flash chamber to the purge column 24, as shown in FIG. 1. Alternatively, the fluff may be passed through a conveyor dryer and then to a purge column as described in U.S. Pat. No. 4,501,885, issued to Sherk et al, which is incorporated by reference herein. (The purge column 24 may follow the second flash chamber instead). Additional hydrocarbon fluids, including hydrocarbon fluids-entrained within the polymer particles, are separated from the fluff in the purge column 24 by passing nitrogen gas through the solid polymer particles (the fluff). The nitrogen extracts hydrocarbon fluids, thereby leaving polymer solids essentially free of hydrocarbon fluids. The polymer solids are then deposited, collected, ejected or otherwise withdrawn from a bottom portion of the purge column 24.

The intermediate pressure chamber may be supported above the purge column. The solids that exit the intermediate pressure chamber are fed to the purge column by gravity through a fluff chamber (lockhopper) isolated by two valves. The two valves alternate opening and closing to fill and empty the fluff chamber (lockhopper). The fluff chamber has a clean-out screen and valves to isolate the operating valves for maintenance. Structure supports the intermediate pressure chamber, fluff chamber and operating and isolating valves high in the air.

Alternatively, the design may be modified to replace the fluff chamber between the intermediate pressure zone and the purge zone with a transporter tank, which is another technique for transferring polymer solids from an intermediate pressure zone to a lower pressure zone. Transporter tanks are also known referred to as blow tanks or as a solids pump (see Zenz, "Fluidization and Fluid-Particle Systems" 1989, p. 665, which is incorporated herein by reference). Alternately a restricted pipe discharge system can be used. With this system, solids are simply discharged in packed-bed flow. On FIG. 1, a restricted pipe discharge system may be put in place at the location of line 58, which is between flash gas separator 18 and purge column 24 to allow easier filling of purge column 24 and to prevent back pressure that would hinder material flow. Alternatively, line 58 may be employed as the primary or exclusive means for transferring polymer solids from flash gas separator 18 to purge column 24. The valve on line 58 is desirably located near purge column 24.

The nitrogen and extracted hydrocarbon fluids are then passed as a mixed gas stream out a top portion of the purge column 24 to an isobutane/nitrogen recovery unit (INRU) 28. The INRU processes the mixed gas stream removed from the fluff in the purge column. The INRU recovers hydrocarbons by condensing the hydrocarbon vapors into liquids. The INRU 28 also separates nitrogen from the hydrocarbon vapors. The nitrogen can then be passed back to the purge column 24 through a nitrogen return line 60. The separated diluent and other hydrocarbons (recovered hydrocarbon liquids) can be returned to the recycle tank 30 through a first hydrocarbons path 53 (e.g., a conduit through which hydrocarbons exit the INRU and are transferred to other equipment) and ultimately returned to the loop reactor 14. Alternatively, some or all of the liquids from the INRU 28 may be sent to a heavies column 32 through a second hydrocarbons path 55. The INRU is designed to produce a liquid product which contains substantially all the hydrocarbons (other than the solid polymer particles) removed in the purge column.

The vapor stream which has been vaporized either in the flashline 54 and/or in the flash gas separator 18, which is also referred to herein as the first vapor stream, is passed to condenser 29 by way of vapor removal line 56. The vapor removal line 56 may include a series of filters and components, such as bag filters, for filtering fine polymer particles from the vapor stream in order to prevent the fines from entering downstream equipment. The vapor stream is primarily isobutane diluent, but the vapor stream diluent also contains heavies, such as 1-hexene co-monomers and other hydrocarbons having six or more carbon atoms. The vapor stream may also contain lighter hydrocarbons such as ethane and ethylene. In condenser 29, at least a major portion of the vapor stream is condensed by heat exchange with a suitable exchange fluid. The heat exchange fluid used by condenser 29 to condense the vapor from the flash gas separator is at a temperature in the range of from about 65° F. to about 150° F., alternatively from about 75° F. to about 140° F., alternatively from about 85° F. to about 130° F. The outlet of the condenser 29 is fluidly connected to recycle tank 30.

The recycle tank 30 can be equipped with an escape valve 31 for lights. If lights build up in the recycle tank 30, the valve will open and direct gas via line 62 to a fractionation column (e.g., column 32) where lights are separated from diluent and removed from the system. By limiting the feed from the recycle tank to fractionation to the overhead vapor in the recycle tank, the amount of hydrocarbon fluids passed to fractionation is greatly reduced. Indeed, most hydrocarbon fluid separated from the effluent slurry withdrawn from the polymerization reactor will not be passed to fractionation but rather will be recycled to the reactor without fractionation. An advantage from this is that less fractionation is performed and smaller fractionation columns may be used for a given amount of hydrocarbon fluids withdrawn from the reactor. From the fractionation columns 32 and 34 relatively pure hydrocarbon fluid is passed to the olefin-free surge tank 36. The olefin free surge tank 36 receives diluent that has been passed through the fractionation columns and as a result is essentially free of both lights and heavies. Since the diluent is essentially free of olefin monomer, it is suitable for passing through olefin-free diluent line 37 to the catalyst feed tank 12 for making catalyst slurry or catalyst mud. However, olefin-free diluent in excess of that desired for making catalyst slurry or catalyst mud can be passed back to the recycle tank 30 via valve 41 and line 39 for recycling to the reactor 14. Furthermore, most of the diluent is not passed to fractionation, but rather is recycled to the reactor without fractionation. This permits minimizing the size of the fractionation equipment. It also avoids unnecessary separation of monomer from diluent.

Figure 2:
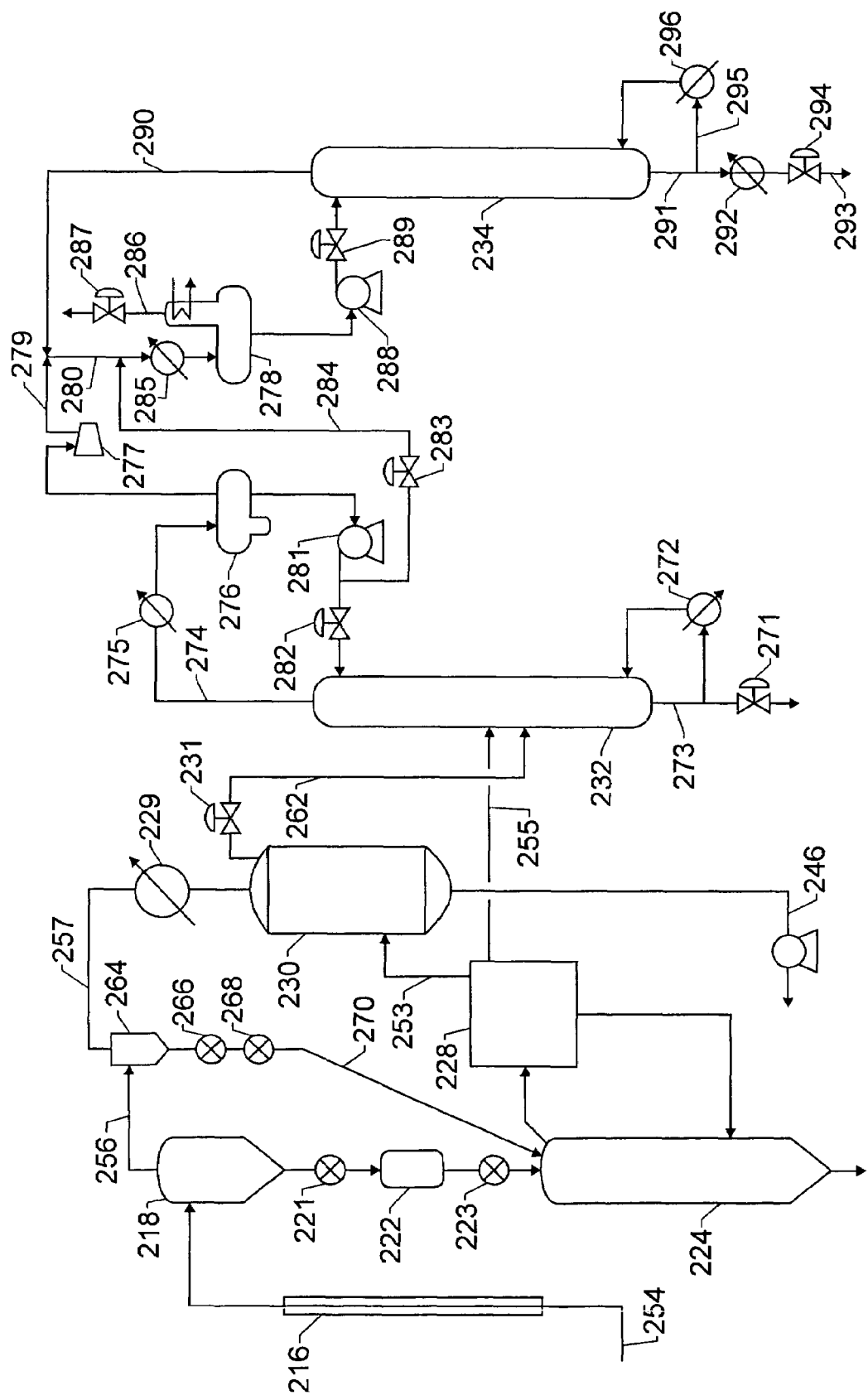
FIG. 2 illustrates a recovery and recycle system for recycling diluent to a reactor and recovering a purge gas.

FIG. 2 shows a system comprising a purge column, a hydrocarbon/purge gas recovery unit, a recycle tank, and fractionation columns. An effluent slurry taken off from the polymerization reactor enters line 254 and proceeds to flow through line 254 so as to be heated by flashline heater 216 prior to its introduction to flash gas separator 218. Flash gas separator 218 is operated at a pressure hereafter referred to as the first flash pressure. The first flash pressure is preferably about 10 psia higher than what is hereafter referred to as the first fractionation pressure, or that pressure at which the first fractionation stage operates. The first fractionation stage includes fractionation column 232. A substantial portion of liquid in the effluent slurry is flashed to vapor before or in flash gas separator 218, and the small difference between the first flash pressure and the first fractionation pressure induces the flow of such vapor through line 256 to cyclone (or other type of filter device) collector 264 and also the flow of vapor from cyclone collector 264 to column 232 via line 257. The flash gas separator 218 can be replaced with a cyclone. The vapor stream which has been vaporized either in the flashline 254 and/or in the flash gas separator 218 is also referred to herein as the first vapor stream. A vapor stream exits cyclone 264 and travels through vapor removal line 257 to condenser 229. The first vapor stream is passed through the flash gas condenser 229, which may condense, or liquefy, the diluent. The condensed stream is passed to recycle tank 230. Recycle tank 230 is equipped with an escape valve 231 for volatile materials which may be sent to the column 232 via line 262. Recycle tank 230 serves as a vapor-liquid separation drum, and liquids may be pumped directly back to the loop reactor through line 246.

Cyclone (or filter) collector 264 removes fine polymer solids, hereafter referred to as polymer particles, which are entrained in vapor. The thus removed polymer particles are passed through line 270 to purge column 224. Valves 266 and 268 along line 270 are operated by a sequencing controller (not shown) to alternately open and close such valves. For example, valve 266 can be opened for a predetermined period of time while valve 268 remains closed, during which time the portion of line 270 between valves 266 and 268 fills with polymer particles. Valve 266 is then closed and valve 268 opened to allow the passage of polymer particles through valve 268 and line 270 to purge column 224. Such sequence is then repeated similarly. Although the illustrated embodiment uses cyclone collectors to remove polymer particles from vapor in passage from the flash tanks to column 232, other types of filters such as bag filters and cartridge filters can also be used if desired.

Polymer solids and residual liquid (that liquid not vaporized in flash tank 218) are passed from flash tank 218 to purge column 224 by means of a valve 221, surge vessel 222 which is allowed to fill with polymer solids periodically during the sequence, and another valve 223. Valves 221 and 223 are operated by a sequencing controller which is not shown. Polymer solids then pass into purge column 224 which uses a purge gas to separate hydrocarbon fluids from polymer solids. The purge gas and hydrocarbon fluids are separated in hydrocarbon/purge gas recovery unit 228. Operation of the hydrocarbon/purge gas recovery unit is describe more fully in connection with FIG. 3. Hydrocarbon from the recovering unit 228, preferably in liquid form are transferred through line 253 to the recycle tank 230 and/or through line 255 to the first fractionation column 232, through first and/or second hydrocarbon paths, respectively.

FIG. 2 also shows various equipment that may be used with fractionation columns. The first fractionation pressure, the pressure at which column 232 operates, can be in the broad range of about 100-200 psia, but is more preferably about 130-180 psia, and most preferably about 140-160 psia, to minimize total power requirements. Preferred temperature conditions in column 232 include an overhead temperature (temperature at the top of the column) of about 130-160° F. and a bottoms temperature (temperature at the bottom of the column) of about 310-380° F.

Liquid bottoms product, containing heavy hydrocarbons and some hexene, is withdrawn from column 232 through bottom draw 273. A first portion of the bottoms product passes through flow control valve 271 and then to flare or incinerator. A second portion of the bottoms product is passed from line 271 and through a line to heater (reboiler) 272, and from there, through a line back to column 232. Column 232 may operate without a sidedraw. Alternatively, a vapor sidedraw may be included for use to recover 1-hexene for recycle.

Overhead vapor from column 232, containing isobutane, ethylene, ethane, hydrogen, and nitrogen, passes through top draw 274 to cooler 275. Cooler 275 substantially condenses the overhead vapor. The resulting substantially condensed overhead stream, at a preferred temperature of about 90-110° F., flows through a line to overhead accumulator 276 in which liquid and vapor from such stream are allowed to separate. The contents of accumulator 276 are at the first fractionation pressure and at the aforementioned temperature of about 90-110° F.

Vapor from accumulator 276, containing ethylene and isobutane and also containing ethane, hydrogen, and nitrogen, is passed through a line to compressor 277. Compressor 277 is preferably a single stage centrifugal compressor such as, for example, the Sundyne Model LMC-311P compressor. Compressor 277 compresses the vapor to approximately a second fractionation pressure, preferably about 220-250 psia, at which a second fractionation stage operates. Such fractionation stage includes a fractionation column 234 (having a preferred overhead temperature of about 110-120° F. and a preferred bottoms temperature of about 180-200° F.) and an associated overhead accumulator 278. Vapor as compressed by compressor 277 flows through line 279 to line 280. The compressor 277 may be eliminated and fractionator 234 may operate at a slightly lower pressure than fractionator 232. For example, fractionator 234 (Lights Column) may operate at approximately 130 to 150 psia.

Liquid from accumulator 276, typically containing about 95-98 weight percent isobutane and about 2-5 weight percent ethylene, passes through a line to pump 281 (preferably a centrifugal pump) which increases the pressure of the liquid to preferably about 250-280 psia. Liquid is pumped by pump 281 through another line, and a first portion) flows through flow control valve 282 to column 232 as reflux. A second portion) of the liquid pumped by pump 281 flows from lines to flow control valve 283, to the second fractionator.

Liquid as pumped through line 284 is a major portion by weight of the total flow of pumped liquid and compressed vapor flowing through lines 284 and 279, respectively. This major portion is preferably about 75-95%, and most preferably 80-90%. In some circumstances, the vapor portion is eliminated.

Vapor from line 279 and liquid from line 284 flow to and through cooler 285, and then through a line for delivery to accumulator 278 at approximately the second fractionation pressure. Liquid and vapor separate in accumulator 278. Accumulator 278 has a vent column condenser of which the upper portion is cooled by a propylene refrigerant to achieve an overhead temperature of about −25 to −10° F. At this temperature most of the isobutane vapor is condensed, while some ethylene, hydrogen, nitrogen, and ethane, as well as a small amount of isobutane, are vented through line 286 and flow control valve 287. The thus vented vapor can go to flare or to an ethylene plant. Alternatively, in condenser 285, accumulator 278, pump 288, and control valve 289 may be omitted, and vapor feed 279 and liquid feed 284 may enter column 234 directly. The refrigerated condenser is located directly on top of column 234.

Liquid from accumulator 278 flows through a line to pump 288, and pump 288 pumps the liquid through a line and flow control valve 289 to column 234 at approximately the second fractionation pressure. Overhead vapor from column 234, containing ethylene and isobutane, is passed through line 290 to line 280. At least a portion of such overhead vapor is condensed by cooler 285 and then returned by pump 288 to column 234 as reflux.

Liquid bottoms product, comprising substantially pure olefin-free isobutane, is withdrawn from column 234 through the bottom line 291. A first portion continues to flow through line 291, to and through cooler 292, and then through line 293 and flow control valve 294 to storage for recycling to the reactor (not shown). A second portion passes from line 291 to heater 296 (reboiler) via line 295, and from there through a line back to column 234. The bottom product from column 234 is steam entering cooler 292.

Figure 3:
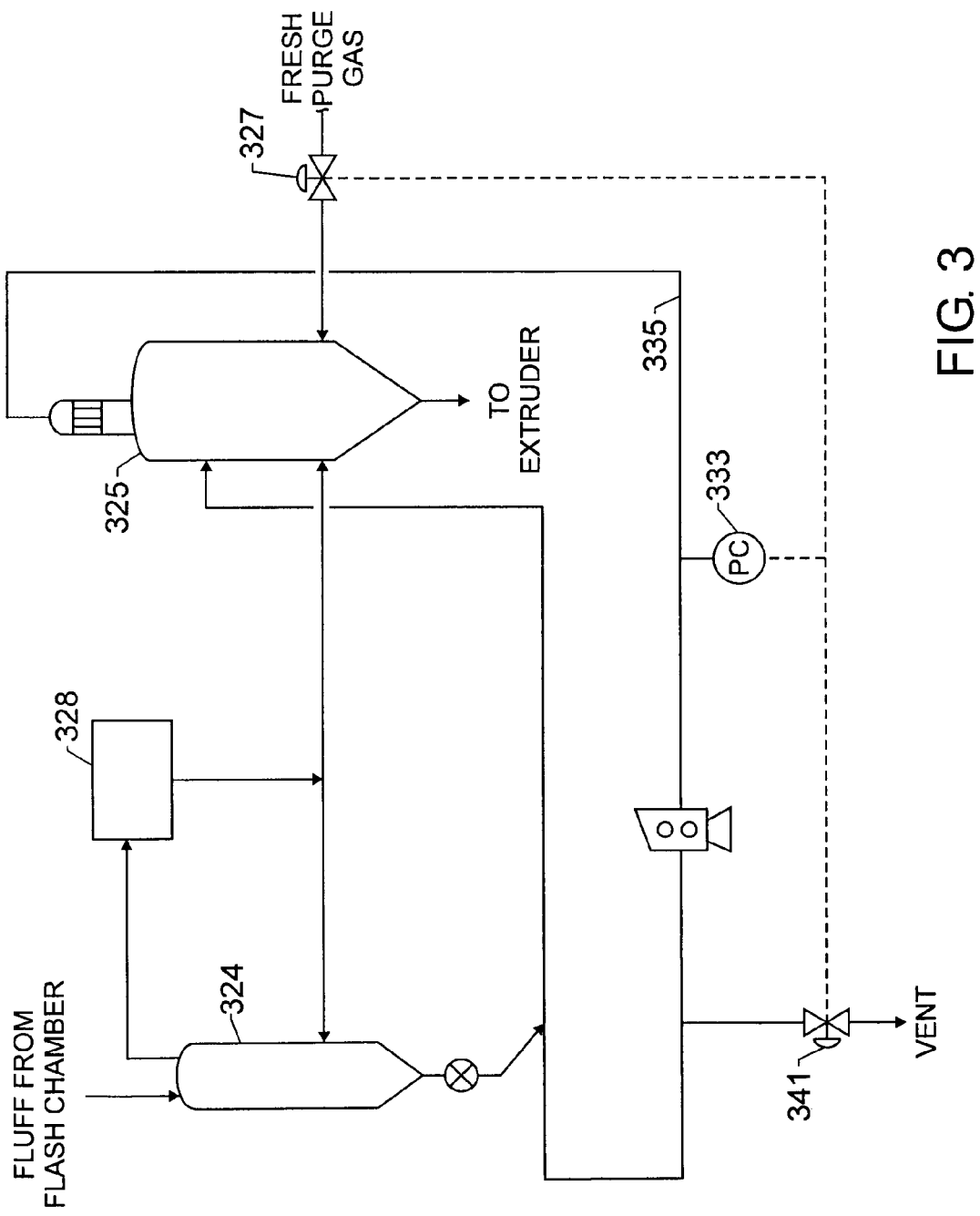
FIG. 3 illustrates a system for recovering a purge gas and feeding a portion of it to an extruder feed tank.

FIG. 3 illustrates how purge gas from a hydrocarbon/purge gas recovery unit 328 (such as an INRU, Isobutane/Nitrogen Recovery Unit) may be fed to an extruder feed tank 325 in addition to (or instead of) the purge column 324. An advantage of this arrangement is the integration of the purge gas in the purge column/recovery unit, fluff transport, and extruder feed tank into one system. This is preferred over providing a separate closed loop nitrogen transport system. Another advantage is the reduction in the amount of purge gas that is vented or flared. The purge gas typically comprises nitrogen, and emissions of nitrogen oxides is desirably limited. Nitrogen oxides may be produced by flaring nitrogen from the purge column and/or recovery unit. By using an appropriate recovery unit, a high-purity nitrogen stream may be produced, which is suitable for use in fluff transport and/or extruder feeding. Since the high-purity nitrogen stream contains little hydrocarbon fluids, it may be used for fluff transport or extruder feeding without contaminating the fluff with the hydrocarbons removed in the purge column 324. A suitable recovery unit 328 for producing a high-purity nitrogen stream may be obtained from Air Products and Chemicals, Inc., Allentown, Pa. A suitable recovery unit utilizes compression and condensation to recover the hydrocarbons as liquids and may use pressure swing adsorption beds to separate nitrogen (purge gas) from isobutane (hydrocarbon fluid). The pressure swing adsorption (PSA) beds purify the uncondensed portion, producing a high purity nitrogen stream, and some nitrogen containing the hydrocarbons is recycled from the PSA beds back to the compressor.

As shown in FIG. 3, high purity nitrogen from INRU 328 can be passed both to the purge column 324 for the purging operation and to the extruder feed tank 325 for additional purging and for make-up to the closed loop transfer system. Additional fresh makeup nitrogen can also be introduced to the extruder feed tank 325, and this introduction can be controlled by fresh purge gas valve 327 which is in informational contact with a pressure controller 333. The pressure controller measures the pressure in line 335 and adjusts extruder feed gas vent valve 341 and/or fresh purge gas valve 327 as desired.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

We claim:

1. A process for slurry polymerization and for separating hydrocarbon fluid from solid polymer particles and purge gas, the process comprising:

polymerizing in a reaction zone at least one olefin monomer to produce a slurry comprising solid polymer particles and hydrocarbon fluid;

withdrawing a portion of the slurry from the reaction zone;

separating at least a majority of the hydrocarbon fluid from the solid polymer particles in an intermediate pressure zone as a vaporized hydrocarbon fluid stream;

condensing the vaporized hydrocarbon fluid stream in a condensing zone, whereby a condensed hydrocarbon fluid stream is formed;

transferring the solid polymer particles from the intermediate pressure zone to a purge zone in which a purge gas is passed through the solid polymer particles to remove entrained hydrocarbon fluid, thereby forming a mixed stream containing hydrocarbon vapor and purge gas;

transferring the mixed stream to a recovery zone where the purge gas and hydrocarbon fluid are separated to form a recovered purge gas stream and a recovered hydrocarbon fluid stream;

passing at least a first portion of the recovered purge gas stream from the recovery zone to the purge zone;

passing at least a first portion of the recovered hydrocarbon fluid stream from the recovery zone to a fractionation zone;

passing a second portion of the recovered hydrocarbon fluid stream from the recovery zone to a recycle zone;

transferring the condensed hydrocarbon fluid stream from the condensing zone to the recycle zone; and transferring at least a majority of the condensed hydrocarbon fluid in the recycle zone to the reaction zone without fractionating the condensed hydrocarbon fluid.

2. The process of claim 1, comprising passing a second portion of the recovered purge gas stream from the recovery zone to a closed loop transfer zone.

3. The process of claim 1, comprising feeding fresh purge gas to an extrusion feed zone and refraining from feeding fresh purge gas to the purge zone.

4. The process of claim 1, further comprising transferring vapor from the recycle zone to the fractionation zone.

5. The process of claim 4, comprising transferring substantially no liquid from the recycle zone to the fractionation zone.

6. The process of claim 5, comprising transferring liquid hydrocarbon from the fractionation zone to a catalyst preparation zone.

7. The process of claim 1, wherein the recovered purge gas stream from the recovery zone is not flared.

8. The process of claim 1, wherein the recovered purge gas stream exiting the recovery zone contains less than 5000 ppm of hydrocarbon.

9. The process of claim 1, wherein the recovered purge gas stream exiting the recovery zone contains less than 1000 ppm of hydrocarbon.

10. The process of claim 1, wherein the recovered purge gas stream exiting the recovery zone contains less than 500 ppm of hydrocarbon.

11. The process of claim 1, wherein the recovered purge gas stream exiting the recovery zone is essentially free of hydrocarbon.

12. The process of claim 1, wherein the purge gas is nitrogen and the hydrocarbon fluid comprises a diluent.

13. The process of claim 1, comprising passing a second portion of the recovered purge gas stream from the recovery zone to an extrusion feed zone.

14. The method of claim 1, wherein the reaction zone comprises a loop reactor.

15. An apparatus for slurry polymerization in a hydrocarbon fluid and for separating hydrocarbon fluid from solid polymer particles and purge gas, the apparatus comprising:
    (a) a polymerization reactor in which one or more olefins are polymerized to form solid polymer particles in a hydrocarbon fluid;
    (b) an intermediate pressure chamber adapted for the separation of hydrocarbon fluid from the solid polymer particles, the chamber having an inlet for receiving hydrocarbon fluid and solid polymer particles from the polymerization reactor, a polymer outlet for discharging solid polymer particles, and a gas outlet for discharging vaporized hydrocarbon fluid;
    (c) a condenser fluidically connected to the gas outlet of the intermediate pressure chamber and adapted to condense the vaporized hydrocarbon fluid by heat exchange and without compression;
    (d) a purge column fluidically connected to the polymer outlet of the intermediate pressure chamber, the purge column adapted to receive the solid polymer particles from the intermediate pressure chamber without passing through an additional pressure chamber;
    (e) a hydrocarbon/purge gas recovery unit adapted to separate hydrocarbon fluid from purge gas, the recovery unit fluidically connected to a top portion of the purge column and adapted to receive a fluid stream comprising purge gas and hydrocarbon fluid from the purge column;
    (f) a recycle tank adapted to receive condensed hydrocarbon vapor from the condenser and to receive a second hydrocarbon fluid stream from the hydrocarbon/purge gas recovery unit;
    (g) a pump and at least one conduit fluidically connected to a bottom portion of the recycle tank, wherein the pump and the at least one conduit are adapted to transport the condensed hydrocarbon fluid from the recycle tank to the reactor without transporting the condensed hydrocarbon fluid through a fractionation system;
    (h) a vapor delivery conduit coupled to a top portion of the recycle tank and fluidically connected to a first fractionation column; and
    (i) an extruder feed tank adapted to receive the solid polymer particles from the purge column.

16. The apparatus of claim 15, comprising a fresh purge gas feed connected to the extruder feed tank.

17. The apparatus of claim 15, wherein the first fractionation column does not have a sidedraw.

18. The apparatus of claim 17, further comprising a second fractionation column adapted to receive a top product from the first fractionation column.

19. The apparatus of claim 18, comprising a liquid delivery conduit from the second fractionation column to a catalyst preparation tank.

20. The apparatus of claim 15, wherein the recovery unit is not connected to a purge gas flare.

21. The apparatus of claim 15, wherein the extruder feed tank is configured to receive a portion of the purge gas stream exiting the recovery unit.

22. A process for slurry polymerization and for separating hydrocarbon fluid from solid polymer particles and purge gas, said process comprising:

polymerizing in a reaction zone at least one olefin monomer to produce a slurry, comprising solid polymer particles and hydrocarbon fluid;

withdrawing a portion of the slurry from the reaction zone;

separating at least a majority of the hydrocarbon fluid from the solid polymer particles in an intermediate pressure zone as a vaporized hydrocarbon fluid stream;

condensing the vaporized hydrocarbon fluid stream in a condensing zone, whereby a condensed hydrocarbon fluid stream is formed;

transferring the condensed hydrocarbon fluid stream from the condensing zone to a recycle zone;

transferring the solid polymer particles from the intermediate pressure zone to a purge zone in which a purge gas is passed through the solid polymer particles to remove entrained hydrocarbon fluid, thereby forming a mixed stream containing hydrocarbon vapor and purge gas;

transferring the mixed stream to a recovery zone where the purge gas and hydrocarbon fluid are separated to form a recovered purge gas stream and a recovered hydrocarbon fluid stream;

passing at least a portion of the recovered purge gas stream from the recovery zone to the purge zone;

passing a first portion of the recovered hydrocarbon fluid stream from the recovery zone to the recycle zone;

transferring vapor from the recycle zone to a fractionation zone;

passing a second portion of the recovered hydrocarbon fluid stream from the recovery zone to the fractionation zone; and transferring hydrocarbon liquid from the recycle zone to the reaction zone without fractionating the hydrocarbon liquid.

23. The process of claim 22, comprising transferring substantially no liquid from the recycle zone to the fractionation zone.

24. The process of claim 23, further comprising transferring a minor portion of liquid hydrocarbon from the fractionation zone to a catalyst mud preparation zone, and transferring a major portion of the liquid hydrocarbon from the fractionation zone to the recycle zone.

25. The process of claim 22, wherein the recovered purge gas stream from the recovery zone is not flared.

26. The process of claim 22, wherein the recovered purge gas stream exiting the recovery zone contains less than 5000 ppm of hydrocarbon.

27. The process of claim 22, wherein the recovered purge gas stream exiting the recovery zone contains less than 1000 ppm of hydrocarbon.

28. The process of claim 22, wherein the recovered purge gas stream exiting the recovery zone contains less than 500 ppm of hydrocarbon.

29. The process of claim 22, wherein the recovered purge gas stream exiting the recovery zone is essentially free of hydrocarbon.

30. The process of claim 22, wherein the purge gas is nitrogen and the hydrocarbon fluid comprises a diluent.

31. The process of claim 22, wherein the recovered purge gas stream is at least partially used for providing a motive force to solid polymer particles which have already passed through the purge zone.

32. An apparatus for slurry polymerization in a hydrocarbon fluid and for separating hydrocarbon fluid from solid polymer particles and purge gas, the apparatus comprising:

(a) a loop polymerization reactor in which one or more olefins are polymerized to form solid polymer particles in a hydrocarbon fluid;

(b) an intermediate pressure chamber adapted to separate hydrocarbon fluid from the solid polymer particles, the chamber having an inlet for receiving hydrocarbon fluid and solid polymer particles from the polymerization reactor, a polymer outlet for discharging solid polymer particles, and a gas outlet for discharging vaporized hydrocarbon fluid;

(c) a condenser fluidically connected to the gas outlet of the intermediate pressure chamber, the condenser adapted to condense the flashed hydrocarbon fluid by heat exchange and without compression;

(d) a purge column fluidically connected to the polymer outlet of the intermediate pressure chamber and adapted to receive the solid polymer particles from the intermediate pressure chamber without passing through an additional pressure chamber;

(e) a hydrocarbon/purge gas recovery unit adapted to separate hydrocarbon fluid from purge gas, wherein the recovery unit is fluidically connected to a top portion of the purge column and adapted to receive a fluid stream comprising purge gas and hydrocarbon fluid from the purge column;

(f) a recycle tank adapted to receive hydrocarbon liquid from the condenser and to receive hydrocarbon fluid from the hydrocarbon/purge gas recovery unit;

(g) a liquid delivery conduit fluidically connecting a bottom portion of the recycle tank with the polymerization reactor, wherein the fluidic connection between the recycle tank and the reactor does not include a fractionation column;

(h) a vapor delivery conduit fluidically connecting a top portion of the recycle tank with a first fractionation column; and (i) a conduit fluidically connecting the first fractionation column with the hydrocarbon/purge gas recovery unit, wherein the first fractionation column is configured to process hydrocarbon fluid from the hydrocarbon/purge gas recovery unit and vapor from the recycle tank.

33. The apparatus of claim 32, further comprising a second fractionation column adapted to receive a top product from the first fractionation column.

34. The apparatus of claim 33, further comprising a liquid delivery conduit from the second fractionation column to a catalyst preparation tank.

35. The apparatus of claim 33, wherein the first and second fractionation columns do not have sidedraws.

36. The apparatus of claim 32, wherein the recovery unit is not connected to a purge gas flare.

* * * * *